United States Patent
Tang

(10) Patent No.: US 8,096,020 B2
(45) Date of Patent: Jan. 17, 2012

(54) HINGE ASSEMBLY AND FOLDABLE ELECTRONIC DEVICE USING THE SAME

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 539 days.

(21) Appl. No.: 12/268,510

(22) Filed: Nov. 11, 2008

(65) Prior Publication Data

US 2010/0031471 A1 Feb. 11, 2010

(30) Foreign Application Priority Data

Aug. 8, 2008 (CN) .......................... 2008 1 0303611

(51) Int. Cl.
*E05C 17/64* (2006.01)

(52) U.S. Cl. ................. 16/337; 16/307; 16/342

(58) Field of Classification Search .............. 16/221, 16/292, 297, 317, 319, 321, 342, 374, 281, 16/283, 286, 337, 348, 357; 248/478; 403/120
See application file for complete search history.

(56) References Cited

U.S. PATENT DOCUMENTS

| | | | | |
|---|---|---|---|---|
| 3,583,734 A * | 6/1971 | Magi | ............................. | 403/96 |
| 4,884,317 A * | 12/1989 | Liu | ............................. | 16/289 |
| 5,409,297 A * | 4/1995 | De Filippo | ............... | 297/411.32 |
| 6,070,494 A * | 6/2000 | Horng | ............................. | 74/607 |
| 6,532,628 B2 * | 3/2003 | Kim | ............................. | 16/342 |
| 6,609,273 B1 * | 8/2003 | Yamada et al. | ............... | 16/332 |
| 6,684,456 B2 * | 2/2004 | Lee | ............................. | 16/342 |
| 6,829,807 B2 * | 12/2004 | Kim | ............................. | 16/322 |
| 7,237,304 B2 * | 7/2007 | Duan et al. | ..................... | 16/324 |
| 7,870,645 B2 * | 1/2011 | Kim | ............................. | 16/366 |
| 2003/0163901 A1 * | 9/2003 | Pan et al. | ......................... | 16/342 |
| 2006/0218751 A1 * | 10/2006 | Kim et al. | ....................... | 16/387 |

FOREIGN PATENT DOCUMENTS

TW M319627 9/2007

* cited by examiner

*Primary Examiner* — Victor Batson
*Assistant Examiner* — Roberta Delisle
(74) *Attorney, Agent, or Firm* — Altis Law Group, Inc.

(57) ABSTRACT

A hinge assembly includes a shaft, a tube, two friction members, and a resilient member. The tube is rotatably sleeved on the shaft. One of the shaft and the tube defines two receiving holes. The friction members are positioned in the receiving holes. The resilient member causes the friction member to resist the other one of the shaft and the tube which does not define the receiving holes. A foldable electronic device applying the hinge assembly is also provided.

1 Claim, 4 Drawing Sheets

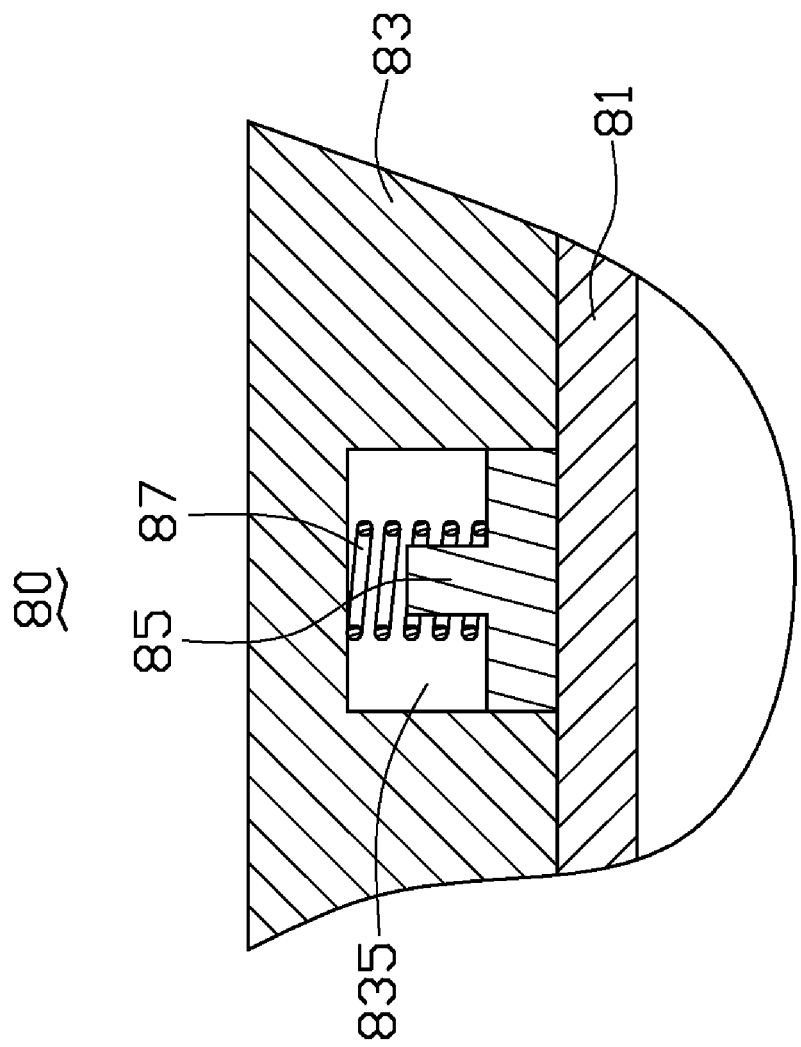

HINGE ASSEMBLY AND FOLDABLE ELECTRONIC DEVICE USING THE SAME

BACKGROUND

1. Field of the Invention

The present disclosure generally relates to hinge assemblies and foldable electronic devices and, particularly, to a hinge assembly used in a foldable electronic device having a top cover and a main body, and a foldable electronic device using the hinge assembly.

2. Description of the Related Art

Foldable electronic devices, such as notebook computers, are popular for their portability. In the foldable electronic device, a cover is rotatably connected to a main body via a typical hinge assembly.

The typical hinge assembly often includes a shaft, a friction member fixed on the shaft, and a rotary member rotatably sleeved on the shaft. The rotary member and the shaft are fixed to the cover and the main body. The rotary member is capable of being positioned in any positions relative to the friction member and the shaft because of friction created between the friction member and the rotary member. Thus, the cover can be opened to any angle relative to the main body, and remain in any position.

However, over time, the friction causes the engaging surfaces of the rotary member and the friction member to become abraded, resulting in little or no friction between the rotary member and the friction member. Thus, the cover would be incapable of remaining in any desired position. Therefore, the hinge assembly has a relatively short service life.

Therefore, a new hinge assembly and a new foldable electronic device is desired to overcome the above-described shortcomings.

SUMMARY

A hinge assembly includes a shaft, a tube, two friction members, and a resilient member. The tube is rotatably sleeved on the shaft. One of the shaft and the tube defines two receiving holes. The friction members are positioned in receiving holes. The resilient member causes the friction member to resist the other one of the shaft and the tube which does not define the receiving holes.

A foldable electronic device includes a main body, a cover, and a hinge assembly rotatably connecting the cover to the main body. The hinge assembly includes a shaft, a tube, two friction members, and a resilient member. The tube is rotatably sleeved on the shaft. The shaft is fixed to one of the main body and the cover, and the tube is fixed to the other one of the main body and the cover. One of the shaft and the tube defines two receiving holes. The friction members are positioned in the receiving holes. The resilient member causes the friction member to resist the other one of the shaft and the tube which does not have the receiving holes.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present hinge assembly and foldable electronic device. Moreover, in the drawings, like reference numerals designate corresponding parts throughout several views, and all the views are schematic.

FIG. 4 is a partial, cross-sectional view of a second embodiment of a hinge assembly.

DETAILED DESCRIPTION OF THE EMBODIMENTS

Figure 1:
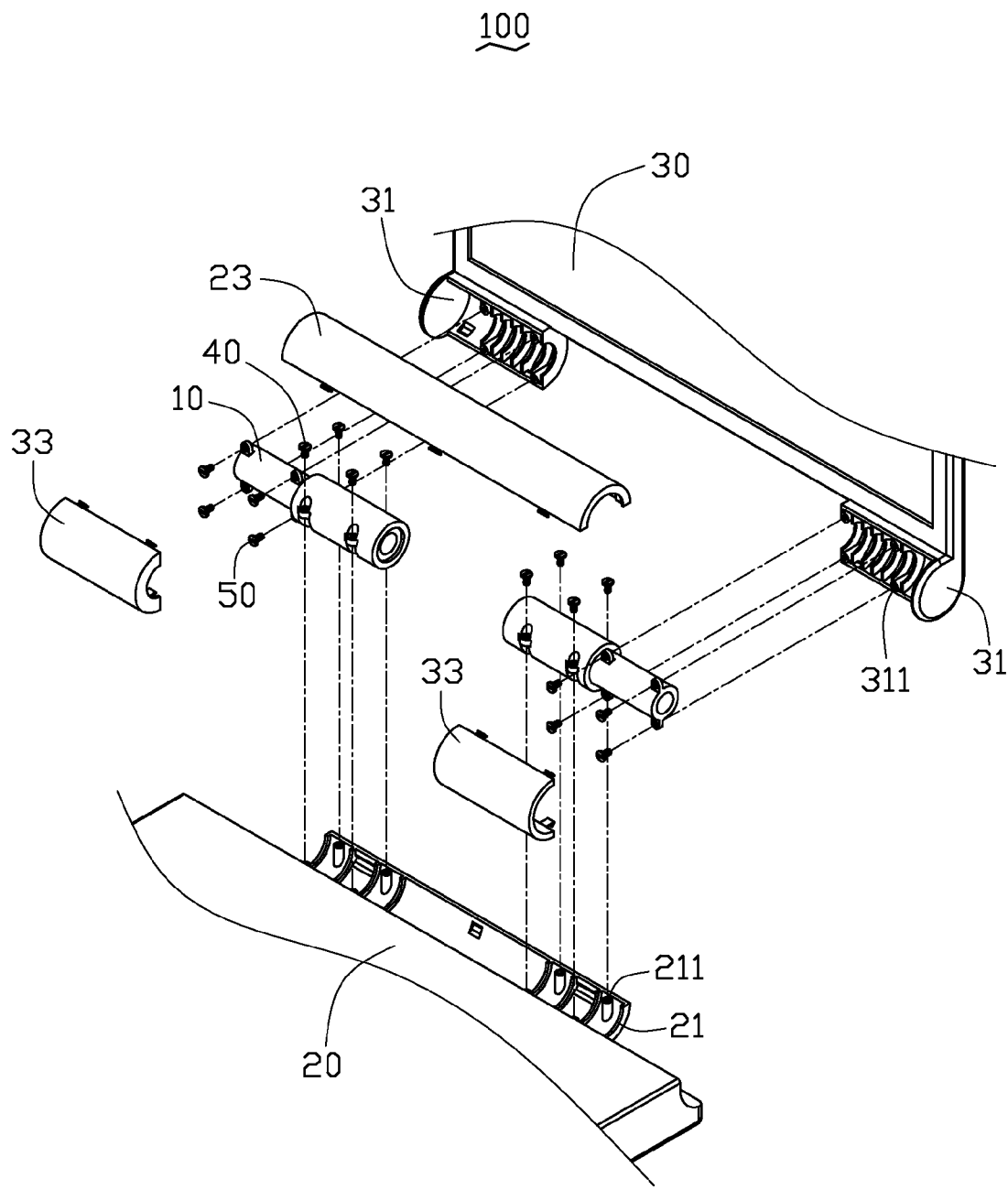
FIG. 1 is an assembled, isometric view of a first embodiment of a hinge assembly, the hinge assembly being shown attached to a main body and a cover of a foldable electronic device.

The present hinge assembly may be used in foldable electronic devices, such as notebook computers, cell phones, media players, and so on. Referring to FIG. 1, for the purposes of conveniently describing the present hinge assembly, a first embodiment of the hinge assembly 10 as used in a notebook computer 100 is described and illustrated.

The notebook computer 100 includes two hinge assemblies 10, a main body 20, and a cover 30. The main body 20 includes a receiving portion 21 and a coupling cover 23. The receiving portion 21 is formed from an edge of the main body 20 and the coupling cover 23 is configured to be coupled to the receiving portion 21. The receiving portion 21 defines a plurality of screw holes 211 therein. The cover 30 includes two mounting portions 31 and two mounting covers 33. The mounting portions 31 are formed from an edge of the cover 30 and the mounting covers 33 are configured to be coupled on the mounting portions 31. The mounting portions 31 define a plurality of screw holes 311 therein.

Figure 2:
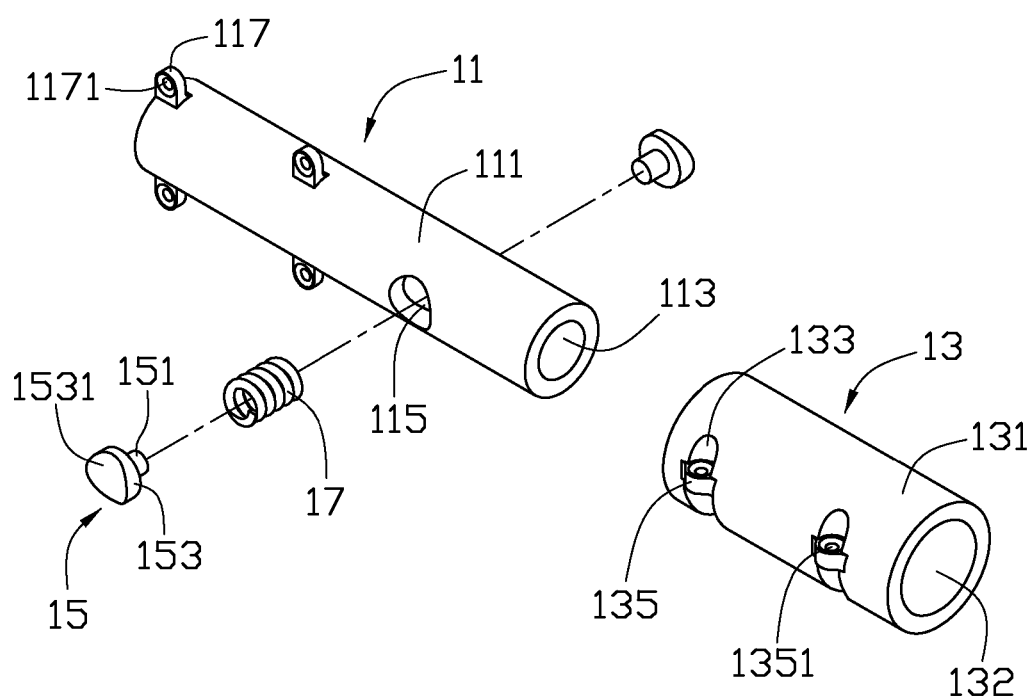
FIG. 2 is an exploded, isometric view of the hinge assembly of FIG. 1.
Figure 3:
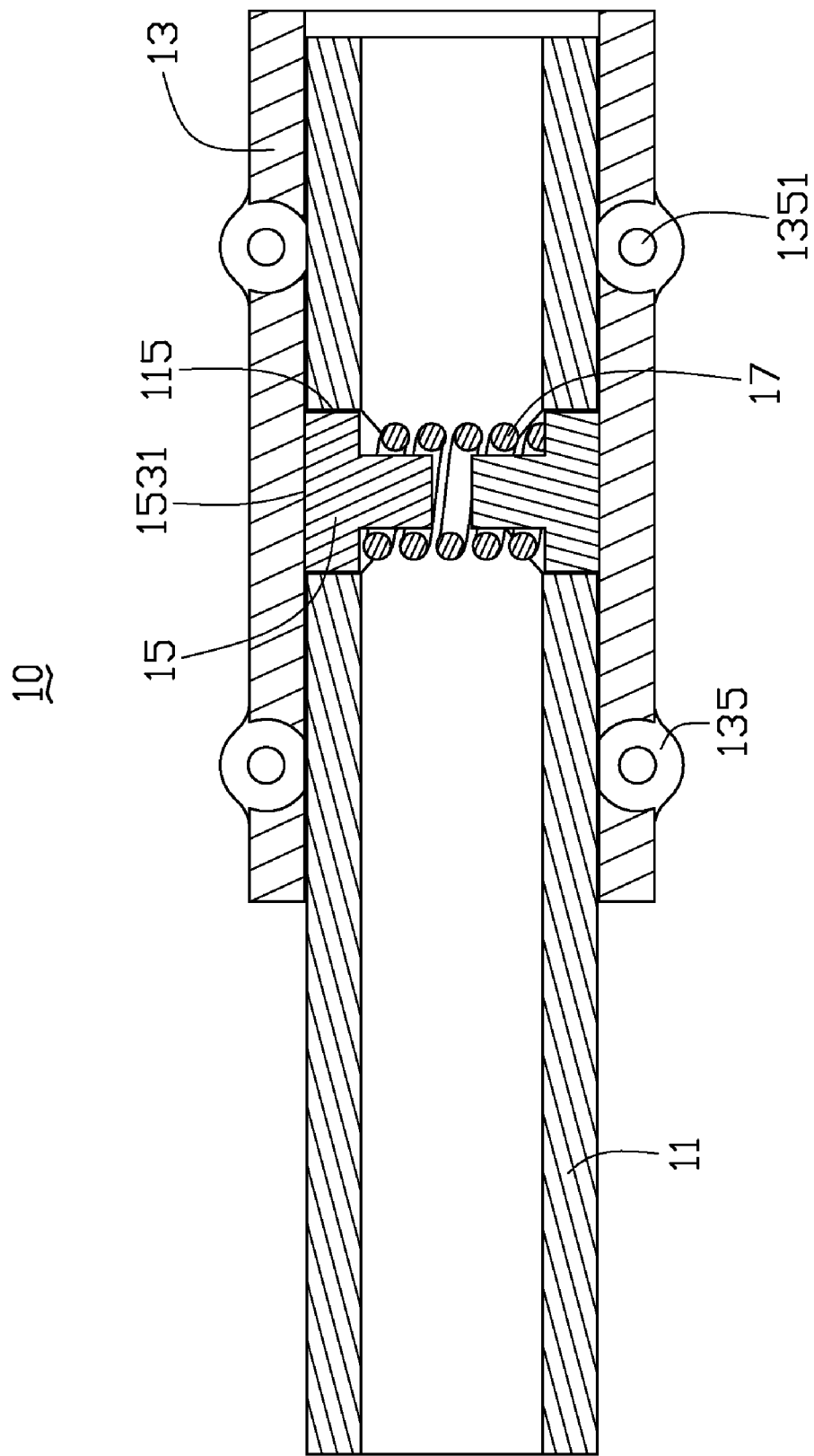
FIG. 3 is a cross-sectional view of the hinge assembly of FIG. 1.

Referring to FIG. 2 and FIG. 3, each hinge assembly 10 includes a hollow cylindrical shaft 11, a hollow cylindrical tube 13, two friction members 15, and a resilient member 17.

The shaft 11 has an outer surface 111 and an inner surface 113. Two receiving holes 115 are defined in a sidewall of the shaft 11. The receiving holes 115 are coaxial and opposite to each other. A plurality of connecting ears 117 is formed on the shaft 11. A connecting hole 1171 is defined in a center portion of each connecting ear 117. The connecting ears 117 are configured for connecting the shaft 11 to the cover 30.

The tube 13 has an outer surface 131 and an inner surface 132. The tube 13 defines two angular slots 133 in a sidewall of the tube 13. A connecting ear 135 is formed adjacent to each end of each angular slot 133. A connecting hole 1351 is defined in a center portion of each connecting ear 135. The connecting ears 135 are configured for connecting the tube 13 to the main body 20. An inner diameter of the tube 13 is substantially the same as or slightly larger than an outer diameter of the shaft 11.

The friction member 15 includes a shaft portion 151 and a head portion 153 formed at an end of the shaft portion 151. The head portion 153 includes a friction surface 1531 at an end opposite to the shaft portion 151. The friction members 15 are configured to be received in the receiving holes 115 of the shaft 11.

In the illustrated embodiment, the resilient member 17 is a helical, compression spring. The resilient member 17 is configured for positioning between the friction members 15. When the resilient member 17 is in a free state (normal state), part of the friction members 15 protrude out of the receiving holes 115 of the shaft 11.

Referring to FIG. 3, the resilient member 17 is received inside the shaft 11 with the axes of the resilient member 17 and the receiving holes 115 aligned in a same line. The friction members 15 are positioned in the receiving holes 115 of the shaft 11 such that the resilient member 17 is positioned between the friction members 15. Ends of the resilient member 17 are sleeved on the shaft portions 151 of the friction members 15. The tube 13 is sleeved on the shaft 11, thereby pushing the friction members 15 to move inwards toward the receiving holes 115, compressing the resilient member 17, and forming the hinge assembly 10. The compressed resilient member 17 creates an elastic force that pushes the friction surfaces 1531 of the friction members 15 to resist the inner surface 132 of the tube 13.

When the hinge assemblies 10 are applied in the notebook computer 100, the cover 30 is moved close to the main body 20 to position the receiving portion 21 between the mounting portions 31. The hinge assemblies 10 are put in the receiving portion 21 and the mounting portions 31. A plurality of screws 40 are inserted in the connecting holes 1351 of the tubes 13 and screwed in the screw holes 211 of the main body 20, thus fixing the tubes 13 to the main body 20. A plurality of screws 50 are inserted in the connecting holes 1171 of the shafts 11 and screwed in the screw holes 311 of the cover 30 to fix the shafts 11 to the cover 30. The coupling cover 23 is coupled on the receiving portion 21 and the mounting covers 33 are coupled on the mounting portions 31 for protecting the hinge assembly 10.

The friction members 15 continuously resist the tubes 13 because of the elastic force created by the resilient members 17, even after the hinge assemblies 10 are used for a long period of time. Thus, the hinge assemblies 10 have a long service life. In use, when the cover 30 is rotated to move relative to the main body 20, the shafts 11 are rotated relative to the tubes 13. Friction is created between the friction members 15 positioned in the shafts 11 and the tubes 13, retains the cover 30 in any position relative to the main body 20.

In another embodiment, each shaft 11 may define only one receiving hole 115. In that case, only one friction member 15 is assembled in each hinge assembly 10. In addition, three or more friction members 15 may be positioned in each shaft 11 and each hinge assembly 10 may include three or more friction members 15. As such, two or more resilient members 17 should be adopted in each hinge assembly 10. A first end of the resilient member 17 resists the friction member 15, and a second end opposite to the first end of the resilient member 17 resists the sidewall of the shaft 11. Furthermore, the shafts 11 may be solid cylinders fixed to the main body 20, and the tubes 13 may be fixed to the cover 30. Moreover, the notebook computer 100 may adopt only one hinge assembly 10.

Referring to FIG. 4, a second embodiment of a hinge assembly 80 includes a shaft 81, a tube 83, a friction member 85, and a resilient member 87. The tube 83 defines one or more receiving blind holes 835 at an inner surface of the tube 83. Accordingly, the hinge assembly 80 may include one or more friction members 85 received in the receiving holes 835. The resilient member 87 and the friction member 85 are received in the receiving hole 835, with the resilient member 87 positioned between the sidewall of the tube 83 and the friction member 85. An end of the friction member 85 resists an outer surface of the shaft 81.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A foldable electronic device, comprising:
 a main body;
 a cover rotatably connected to the main body; and
 a hinge assembly, the hinge assembly comprising:
  a shaft fixed to one of the main body and the cover, wherein the shaft forms a plurality of connecting ears connected to the cover, and each of the connecting ears defines a connecting hole therein, the shaft is a hollow cylinder having an outer surface and an inner surface, the shaft defines two receiving holes in the sidewall of the shaft, and the receiving holes are coaxial and opposite to each other;
  a tube rotatably sleeved on the shaft, and fixed to the other one of the main body and the cover, wherein the tube is a hollow cylinder having an outer surface and an inner surface, an inner diameter of the tube is substantially the same as or slightly larger than an outer diameter of the shaft, the tube defines two angular slots in a sidewall, a connecting ear is formed at each end of each angular slot, each connecting ear defines a connecting hole therein, and the connecting ears are configured for connecting the tube to the main body;
  two friction members positioned in the two receiving holes, wherein each friction member comprises a shaft portion and a head portion formed at an end of the shaft portion, the head portion comprises a friction surface at an end opposite to the shaft portion, and part of the friction members protrude out of the receiving holes of the shaft; and
  one resilient member positioned between the two friction members and causing the friction surfaces of the two friction members to resist the tube, wherein ends of the resilient member are sleeved on the shaft portions of the friction members.

* * * * *